US006502143B1

(12) United States Patent

Bass et al.

(10) Patent No.: US 6,502,143 B1

(45) Date of Patent: Dec. 31, 2002

(54) INTELLIGENT INTERFACE CABLE ASSEMBLY AND METHOD OF PROVIDING THE SAME

(76) Inventors: Edward R. Bass, 320 Putting Green Rd., Trumbull, CT (US) 06611; Konstantin G. Kodonas, 26 Friendly Rd., Norwalk, CT (US) 06851; Vincent R. Weis, 11 Kelly Ct., Sandy Hook, CT (US) 06482

( * ) Notice: Subject to any disclaimer, the term of this patent is extended or adjusted under 35 U.S.C. 154(b) by 0 days.

(21) Appl. No.: 09/476,617

(22) Filed: Dec. 31, 1999

(51) Int. Cl.[7] .................................................. G06F 3/00

(52) U.S. Cl. ............................... 710/1; 710/15; 710/62; 710/130; 712/39; 712/226

(58) Field of Search ............................ 710/1, 9, 12, 15, 710/17, 18, 20, 21, 33, 62, 64, 72, 129, 150; 712/3, 28, 29, 39, 226; 709/200, 201

(56) References Cited

U.S. PATENT DOCUMENTS

| | | | | |
|---|---|---|---|---|
| 4,271,470 A | * | 6/1981 | Dlugos et al. | 364/466 |
| 4,301,157 A | | 11/1981 | Soderberg et al. | 364/464 |
| 4,395,756 A | * | 7/1983 | Daniels | 364/200 |
| 4,410,961 A | | 10/1983 | Dlugos et al. | 364/900 |
| 4,466,079 A | * | 8/1984 | Daniels et al. | 364/900 |
| 4,603,400 A | | 7/1986 | Daniels | 364/900 |
| 4,642,791 A | | 2/1987 | Mallozzi et al. | 364/900 |
| 4,941,091 A | * | 7/1990 | Breault et al. | 364/406 |
| 5,574,947 A | * | 11/1996 | Massa | 710/9 |
| 5,666,292 A | | 9/1997 | Hunter et al. | 395/882 |
| 6,029,155 A | * | 2/2000 | Bass et al. | 705/401 |
| 6,076,081 A | | 6/2000 | Bass et al. | 705/401 |

FOREIGN PATENT DOCUMENTS

| | | | |
|---|---|---|---|
| EP | 0425777 A2 | 5/1991 | H04L/12/56 |

* cited by examiner

*Primary Examiner*—Jeffrey Gaffin
*Assistant Examiner*—Ri Jue Mai

(57) ABSTRACT

A method and apparatus for interfacing a weighing scale and one or more peripheral devices which includes a single intelligent interface cable assembly connected between a weighing scale and a plurality of peripheral devices, the IICA detects the peripheral device protocol by receiving a logic signal indicating which protocol is in operation, if necessary, the IICA then switches the signal protocol of the weighing scale to correspond with the signal protocol of the detected peripheral device protocol. Simultaneous, tripping of a mailing machine to print postage amounts may occur.

21 Claims, 4 Drawing Sheets

INTELLIGENT INTERFACE CABLE ASSEMBLY AND METHOD OF PROVIDING THE SAME

FIELD OF THE INVENTION

The invention disclosed herein relates generally to postage scales adapted to weigh an article and determine the appropriate postage to be applied thereto. Specifically the present invention is directed to a postal scale and a cable having the ability to communicate with incompatible devices.

BACKGROUND OF THE INVENTION

Various postal systems for automatically determining proper postage and interfacing with mailing system peripherals are well known in the art. One such system is disclosed in U.S. Pat. No. 4,395,756 issued to Edward P. Daniels, on Jul. 26, 1983, which describes a microprocessor based system with: a keyboard and display; a scale subsystem processor forming part of a weighing cell, for providing weight information in digital form to the system processor; and, a plurality of peripheral postal devices interfaced to the postal system processor. Another similar system is disclosed in U.S. Pat. No. 4,603,400 issued to Edward P. Daniels on Jul. 29, 1986, disclosing a microprocessor based system with: a keyboard and display; a scale weighing device operatively connected to the system processor; and, postage printing subsystem and peripheral subsystem processors connected to the system processor through a serial communications interface.

The above systems are fully integrated systems and designed to interface with compatible machines. The fully integrated systems are not capable of functioning separately nor are they interchangeable with other peripheral systems.

A need to interface postal scale mailing systems with a variety of mailing system peripherals has developed in an effort to satisfy customer requests for combining incompatible systems to provide personalized mailing solutions. These systems often operate under different protocols and thus, are incompatible U.S. Pat. No. 4,642,791 issued to Mallozzi et al., on Feb. 10, 1987 presents one solution to this problem. This patent discloses an interface that provides communication between a weighing cell providing weight information in the form of code digits representative of arbitrary weight units and optically coupled interface adapter ports which have separate input and output lines.

Another such system is disclosed in U.S. Pat. No. 4,301,507 issued to John H. Soderberg on Nov. 17, 1981, disclosing a serial communications port and a plurality of external devices in which the communications procedure disclosed relates to serial transmission of data and bit by bit return of such data to the transmitter verification. A daisy chain is operatively connected between a plurality of external devices and an associated control is described. However, a communications buffer comprising a daisy chain undesirably prolongs the period of time for transmission of data and increases the possibility of a transmission error.

Yet another such solution is described in U.S. Pat. No. 4,410,961 issued to Dlugos et al., on Oct. 18, 1983 which discloses an interface adapted to interconnect the system processor with a plurality of mailing system peripheral devices. The interface includes a peripheral micro-computer which receives data and command signals from the processor of a scale which communicates through an Echoplex protocol. A multiplexer interconnects the peripheral transmit line of the microcomputer with a selected peripheral device, while an additional multiplexer interconnects the peripheral receive line of the microcomputer with the selected peripheral device. However, only communication between an Echoplex scale and either Echoplex or RS232 peripheral devices is disclosed. A significant disadvantage with this system is that this system requires the user to predetermine and preselect what communication subroutines are necessary to be implemented in order to achieve successful communication. However, with the introduction of a scale which communicates through PB232 protocol a need arose to convert the PB232 protocol to Echoplex protocol.

Multi-cable interfaces as described in the prior art are difficult to install, aesthetically unappealing, and costly. Moreover, interfaces that are attached between cables connecting the incompatible device are expensive and after confusing to the customer during assembly. Increased customer interest in customizing systems has prompted greater interest to provide an inexpensive easy to assemble method and device for enabling incompatible systems to communicate. A further need has developed to provide an interface between a postage value determining system processor such as a PB232 scale and a plurality of peripheral devices associated with a mailing system having either PB232 or ECOPLEX protocols which allows the system processor to communicate irrespective of the processor protocol.

Other objects and advantages of the present invention will be apparent from the detailed description considered in conjunction with the preferred embodiment of the invention illustrated in the drawings, as follows.

SUMMARY OF THE INVENTION

The present invention discloses a smart cable assembly interconnected between a postage scale system configured to detect a plurality of peripheral devices and to communicate with the peripheral devices regardless of the individual device protocol. The present invention includes a postage value determining system processor connected via a smart cable to a plurality of peripheral devices having a variety of mailing system protocols. The peripheral protocol may be either PB232 protocol or Echoplex protocol. Once the scale determines whether the peripheral protocol is Echoplex or PB232, the scale establishes communication between the PB232 scale and the variety of peripheral devices, by converting the PB232 scale protocol to the protocol of the peripheral device, such as for example, either Echoplex or RS232 protocol.

The scale detects which signal protocol is in present operation. Based upon detecting what signal is received from the peripherals, the scale then switches to the postage system signal, which corresponds to the-signal of the peripheral, thus enabling communication. In typical operation, the postage scale is an RS232 protocol while the mailing system peripherals are either RS232 protocol or Echoplex protocol. RS232 and Echoplex protocols are well known in the art, a detailed description of the individual protocols is not necessary for an understanding of this invention. In general, PB232 protocol is a variation of the RS232 Protocol. Not all the signals are used however, voltage levels are the same.

The scale includes a circuit board that has both an RS232 to Echoplex converter, and an Echoplex to RS232 converter. The scale maintains a physical connection through a to the peripheral device through physical ports.

In one method of operation, the scale, detects the peripheral protocol, switches the protocol of the scale to correspond to the peripheral device and then outputs the proper message to the peripheral device.

The cable contains trip circuitry to allow scales communicating via PB232, the ability to not only set Echoplex or PB232 protocol, but, also to trip a mailing machine for printing postage. When a set dollar value amount is transmitted to an electronic postage meter, a request for the value set is then transmitted to the meter. The microcomputer awaits receipt of a signal indicating the amount which has been set by the meter; this value is then transmitted to the system processor for comparison with the set value originally transmitted. Upon a trip command, the microcomputer transmits a trip signal to a mailing machine for tripping the meter and awaits receipt of a meter trip complete signal from the postage meter. In the present invention, the mailing machine trip may originate from the cable or from the peripheral device depending upon whether a PB232 protocol or an Echoplex protocol is transmitted.

A plurality of communications subroutines are stored in the microcomputer program memory. Thus, versatility in the selection of peripherals which may be employed in conjunction with a stand-alone postage scale is desirable and by present invention available. A system output line is provided for communications with a peripheral device employing either the RS232 or Echoplex communications.

The present invention will become more apparent from an understanding of the following description of a presently preferred mode of carrying out the invention when considered in conjunction with the accompanying drawings.

BRIEF DESCRIPTION OF THE DRAWINGS

The present invention will be apparent upon consideration of the following detailed description, taken in conjunction with accompanying drawings, in which like reference characters refer to like parts throughout, and in which.

DESCRIPTION OF THE PRESENT INVENTION

Figure 1:
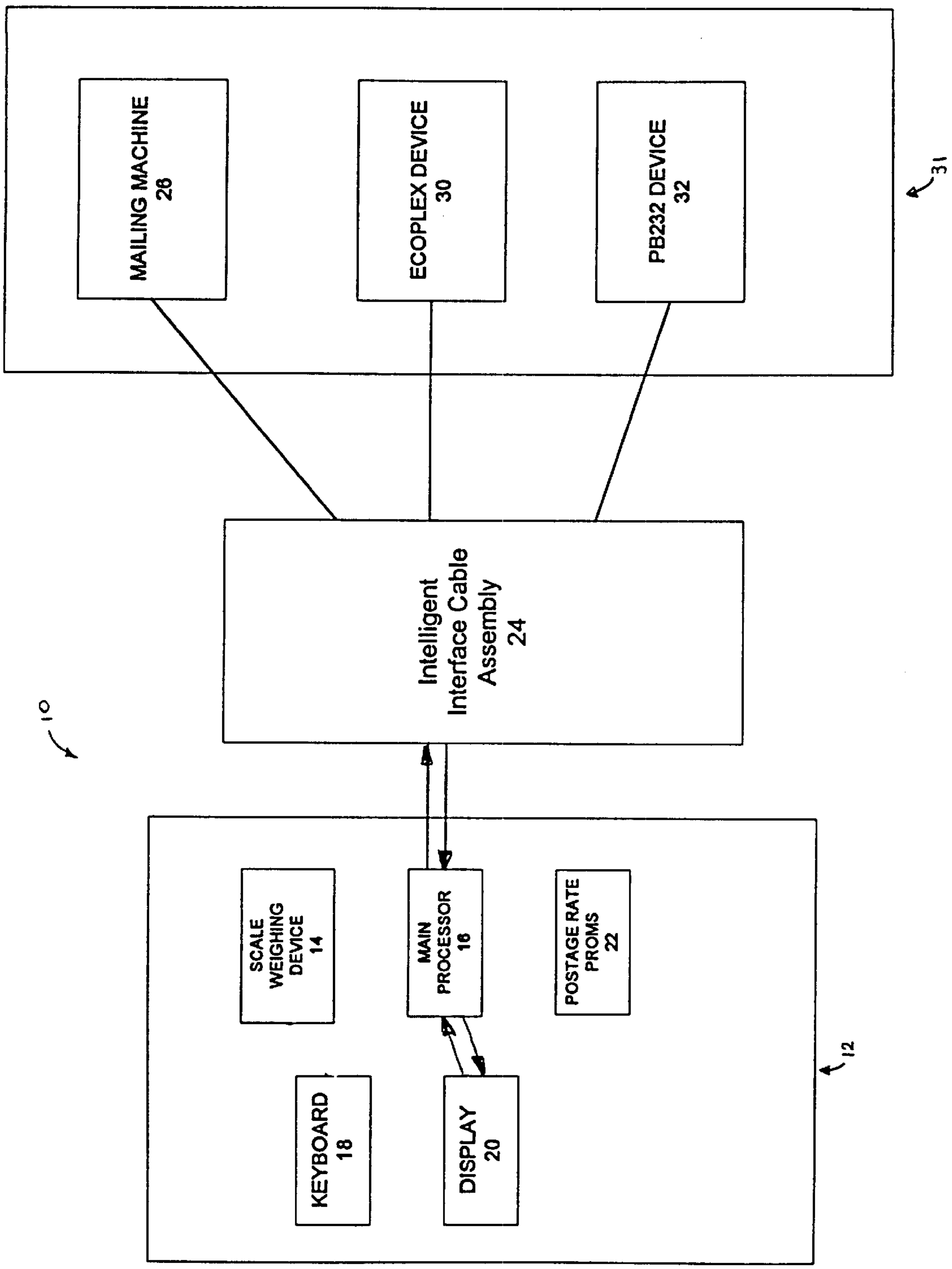
FIG. 1 is a schematized block diagram of a typical mailing system and schematically illustrates the intelligent interface cable assembly constructed in accordance with and embodying the present invention interconnecting a postage value determining system processor associated with a postage scale and a plurality of mailing system peripheral devices.

Referring now in detail to the drawings, the reference numeral 10 of FIG. 1 denotes generally an automated mailing system including scale 15 which further includes a processor controlled stand alone postage scale 12. The postage scale 12 is adapted to calculate the postage or other transportation charges required to transport an article. In most instances, transportation charges are based upon the article weight, class of transportation and, with respect to certain classes, distance to destination (zone). The postage scale 12 includes weighing device 14 having a tray or platform adapted to receive the article to be mailed. The weighing device 14 is interconnected to a main system processor 16. Main system processor 16 is programmed to compute the requisite postage or other transportation charges for an article placed upon the platform.

The data necessary for the determination of article postage (e.g. destination operands, class of transportation operands, etc.), is entered at keyboard 18 and corresponding signals are transmitted to the main system processor 16. Keyboard entries and calculated information are indicated at a display 20.

With the weight, class of transportation and destination zone operands entered, main system processor 16 determines the requisite postage by reference to a postage rate PROM 22 and provides a signal to display 20 for indicating the calculated postage amount. A suitable microprocessor for implementation as main system processor 16 is an Intel 8085 processor available from Intel Corporation of Santa Clara, Calif. The foregoing mode of operation of postage scale 12 is well known to those of skill in the art and typically illustrated in U.S. Pat. No. 4,135,662 entitled Operator Prompting System issued Jan. 23, 1979 to Daniel F. Dlugos and assigned to the assignee of the present invention.

The postage value determining system processor disclosed in U.S. Pat. No. 4,135,662, supra, was an integral part of a complete mailing system and transmitted a postage value signal to a meter setting device for setting a postage meter and dispensing the calculated postage.

Pursuant to the present invention, postage scale 12 is constructed as a stand alone unit for use without peripheral devices associated with a complete mailing system, yet maintains versatility for controlling, transmitting data to, and receiving data from, various peripheral devices if a complete mailing system is desired by the user.

Various mailing system peripheral devices 31 are operatively connected to scale 15. Peripheral devices 31 may include one or more electronic postage meters 30, 32. A mailing machine 26 may also be connected to the system. The Peripheral devices may be for example Echoplex electronic postage meter 30, or PB232 electronic postage meter 32.

Electronic postage meters of this general type are described in U.S. Pat. No. 3,978,457 entitled Microcomputerized Electronic Postage Meter System issued Aug. 31, 1976 to Frank P. Check, Jr. et al. and assigned to the assignee of the present invention. Echoplex electronic postage meter 30 is programmed for communication with the main system processor 16 pursuant to communications routine disclosed in U.S. Pat. No. 4,301,507 previously referred to.

The communications routine is serial character asynchronous, bit synchronous, in message form, with the bits of the message being timed in accordance with a given schedule. The messages are returned or echoed by the recipient, bit by bit, for checking. This communications routine has been designated "Echoplex."

PB232 electronic postage meters 32 is programmed pursuant to the PB232 communications routine developed by Pitney Bowes Inc, (a company located at, One Elmcroft Road, Stamford, Conn.). PB232 is a modification of communications routine RS232 which is well known in the art. This section summarizes the design objectives which have influenced the final design of this protocol. PB232 is intended for use in point-to-point applications only. It contains no provisions for multi-drop applications. PB232 is designed to be able to transmit and receive binary data as simply as possible. Thus, this is a fundamentally 8-bit protocol, since there are many applications in which 8-bit binary data needs to be transported. PB232 is designed to be implemented by standard hardware, cope with errors in transmission, and to require the minimum possible processing in the case of a retransmission and use a minimum of timeout processing in order to maintain end-to-end synchronization. In the interests of simplicity, the protocol is designed to permit only one outstanding message in a particular direction at a time.

Figure 2:
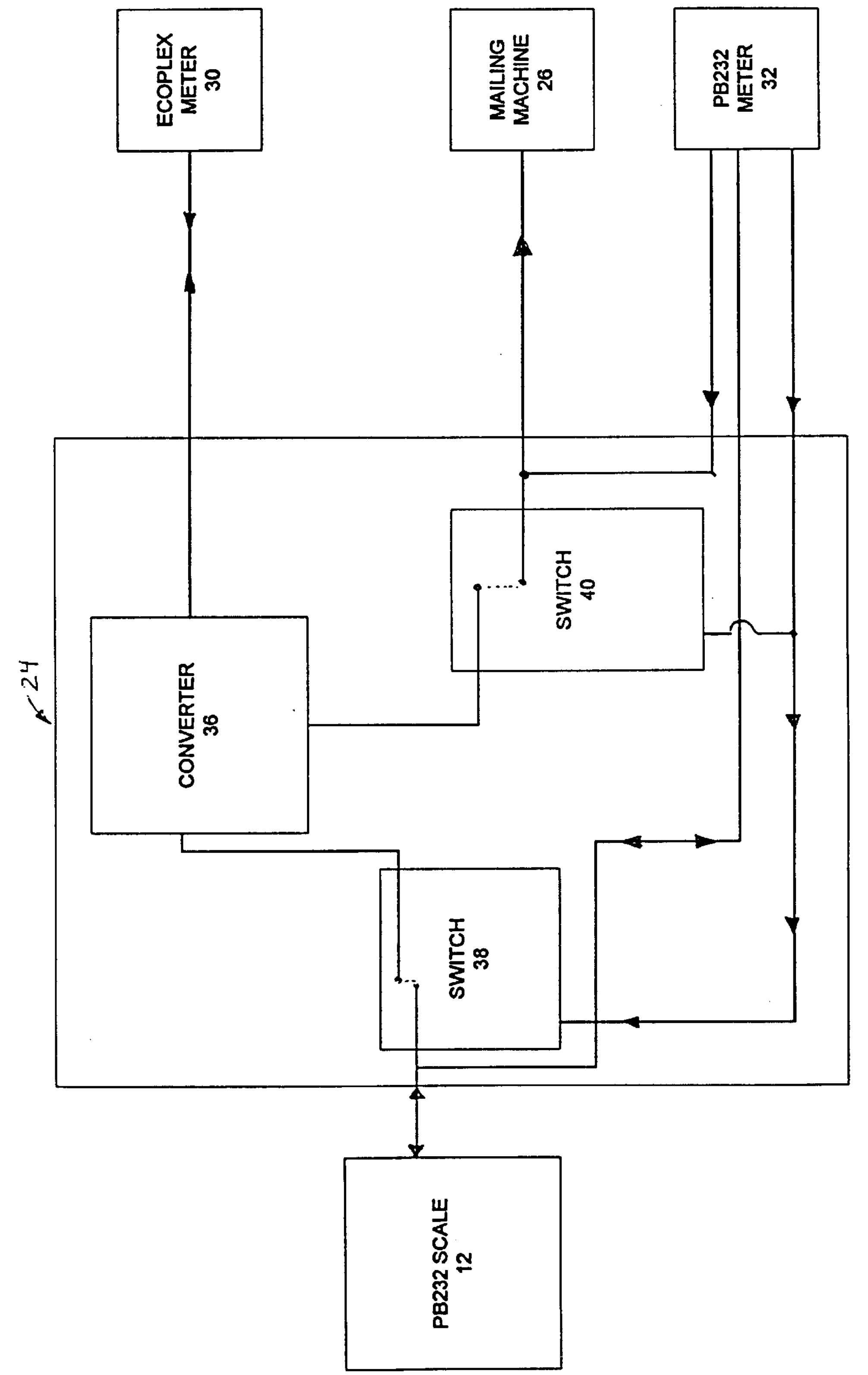
FIG. 2 is a block diagram of the printed circuit board of the scale.

Now, turning to FIG. 2, a schematized block diagram of the switching component of scale 15 is illustrated. Scale 15 includes analog switches 38 and 40 which may be dual RS232 with shut down, wherein the shut down is the desired operator. RS232 protocol is commonly know in the art, therefor, a detailed description is not necessary for an understanding of this invention. The interface switches between Echoplex and PB232 protocol based upon whether the scale 15 received a logic "1" or a logic "0".

Assume that scale 15 is connected between postage scale 12 and peripherals 31. Upon initiation, postage scale 12 transmits a data signal to scale 24. Peripheral 31 transmits a logic signal to Scale 15. In a preferred embodiment, the logic "1" is a 5 volt signal and the logic "0" is an open circuit. When a logic "1" signal is returned, analog switches 38 and 40 are enabled and disengage or shut down. In shut down, analog switch 38 provides communication from postage scale 12 through the enabled analog switch to PB232 meter 32 while preventing data transmission to converter 36. Simultaneously, shut down of analog switch 40 allows postage meter 32 to send a trip signal through enabled analog switch 40 to initiate tripping of mailing machine 26.

Upon start up, scale 15 is physically connected between the postage scale 12 and the peripheral devices scale 15 then detects whether or not the connection is maintained. If scale 15 determines the connection is maintained, scale 15 then determines if it has received a data signal from the weighing scale. If scale 15 has received a data signal from postage scale 12, IICA then determines if it has received a signal from peripheral devices 31. Scale 15 then determines whether the signal is a logic "1" signal or a logic "0" signal. If the signal is a logic "1", scale 15 enables analog switches 38 and 40. Enabling analog switches 38 and 40 allows the data signal transmitted from the postage scale 12 to be transmitted without conversion through IICA enabled switches 38 to PB232 meter 32. PB232 meter 32 then transmits a separate signal through enabled switch 40 directly to mailing machine 26. Mailing machine 26 then prints proper postage as indicated by postage scale 12.

If, however, the signal received by scale 15 is a logic "0" signal, scale 15 does not enable analog switches 38 and 40, thus maintaining a connection and transmitting the data signal to converter 36. Converter 36 then converts the data signal to correspond with the protocol of Echoplex meter 30. The converted signal is transmitted to Echoplex meter 30 while converter 36 simultaneously transmits a signal through switch 40, which is unenabled, to trip, or signal, mailing machine 26 to print postage.

Without PB232 meter 32 connected to scale 15, analog switches 38 and 40 remain closed. Postage scale 12 transmits data through analog switch 38 to converter 36 which converts PB232 data to or Echoplex data signal. The Echoplex data signal is then transmitted to Echoplex meter 30, while converter 36 also initiates the trip signal to which is then sent through closed analog switch 40 to trip mailing machine 26.

Figure 3:
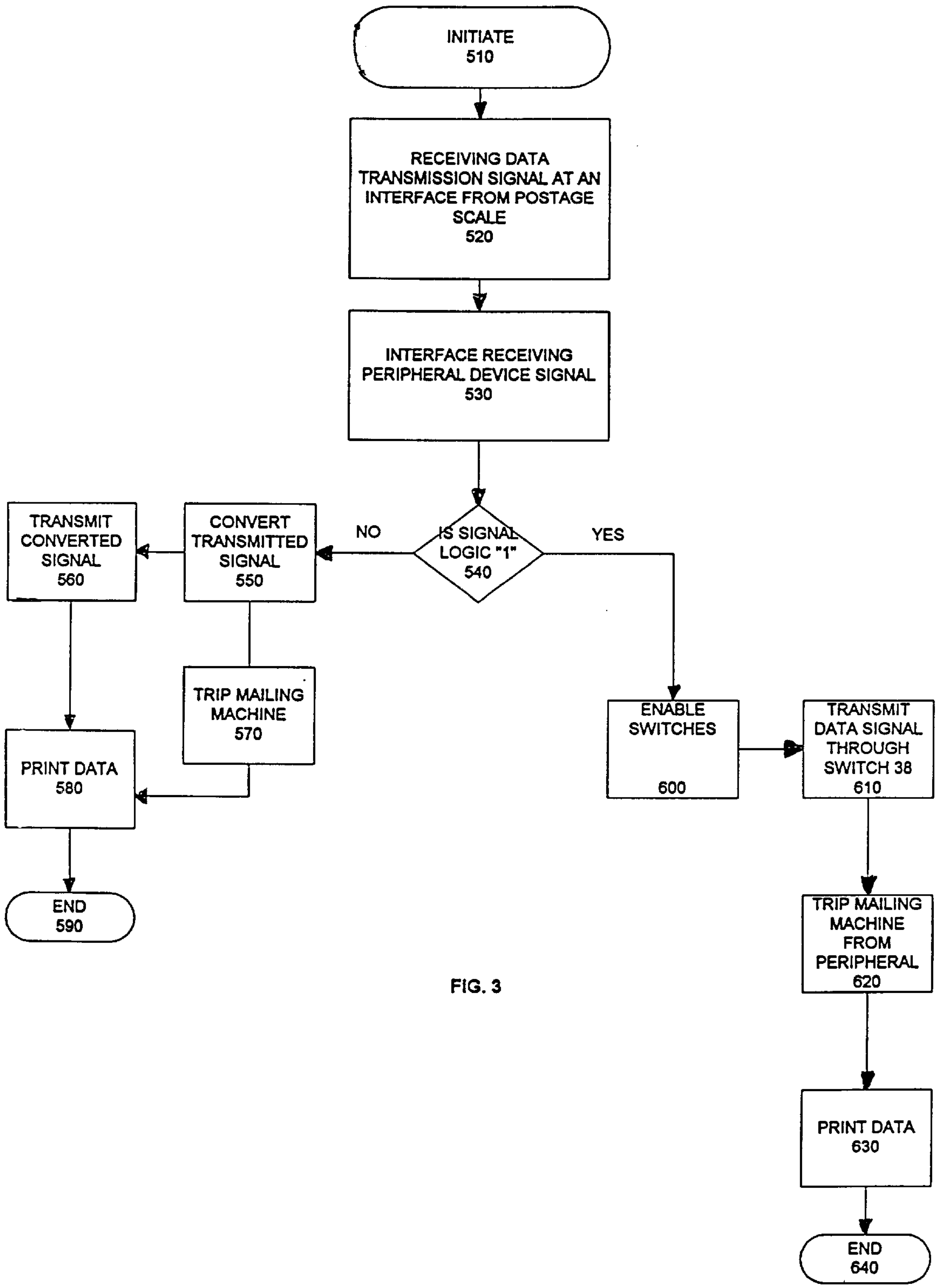
FIG. 3 is a flow chart illustrating a portion of the basic routine of the present invention.
Figure 4:
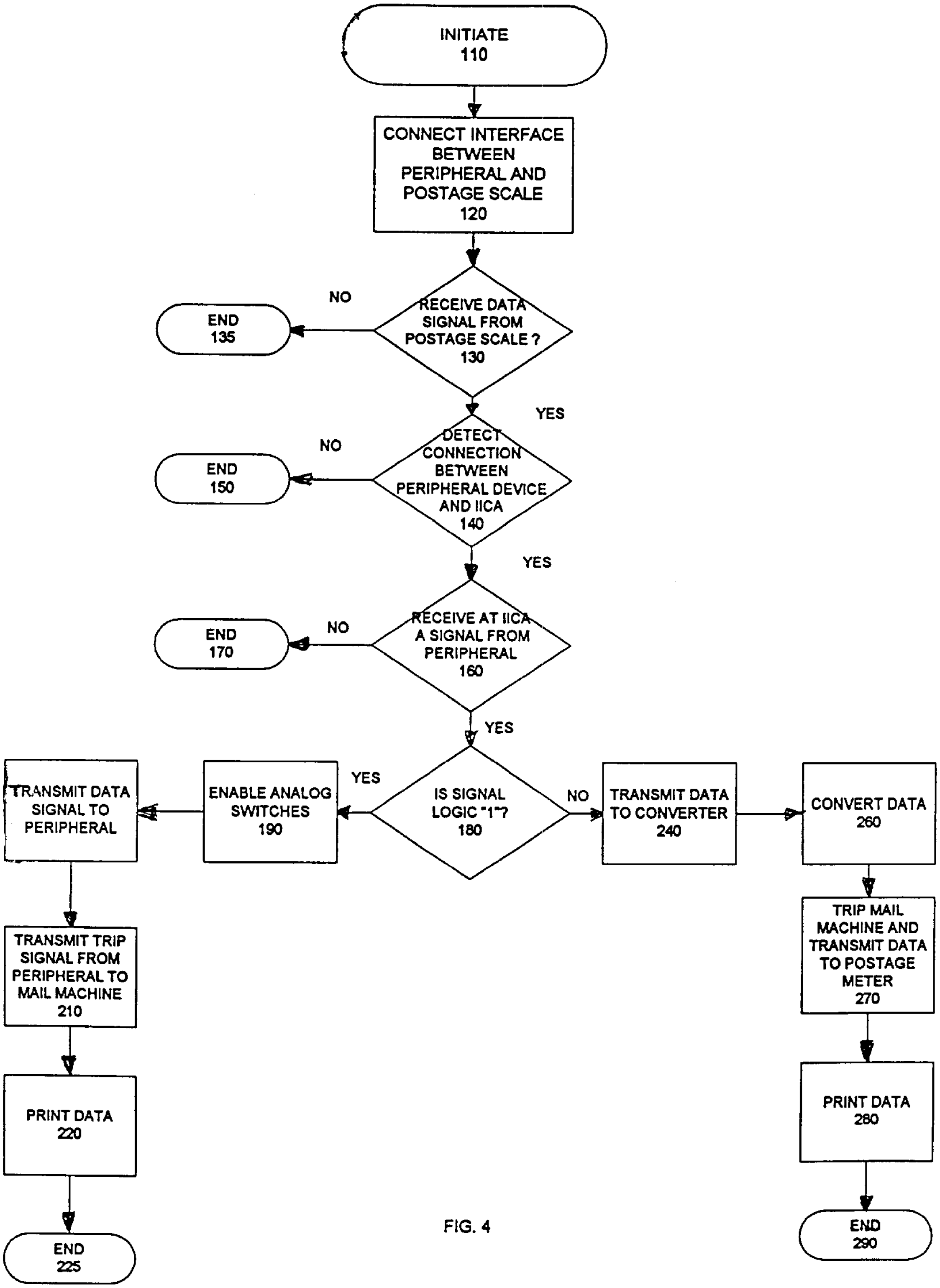
FIG. 4 is a flow chart illustrating a portion of the basic routine of the present invention.

Referring now to FIG. 3 and to FIG. 4, the method for the basic operation of the scale is shown.

In FIG. 3, at step 510, the system is initiated. The method then proceeds to step 520 where the scale 15 receives a data transmission signal from postage scale 12. At step 530, scale 15 receives a signal from peripheral device 31. At step 540, scale 15 determines whether the peripheral device signal is a logic "1" or a logic "0". If scale 15 determines the signal to be a logic "1," the method proceeds to step 600 where switch 38 and switch 40 are enabled. The method continues at step 610 where the signal is transmitted through the first enabled switch 38 to the peripheral device. Finally, at step 630 the transmitted signal is printed and the system ends at step 640. However, if at step 540 scale 15 determines the signal to be a logic "0", then the method continues to step 550 where the data transmission signal is maintained. At step 550, the data signal is transmitted to converter 36 scale 15 converter 36 alters the data signal to correspond with the signal of the peripheral device. At step 560, the scale 15 then transmits the maintained signal to the peripheral device.

Tripping a mailing machine may occur simultaneously with the conversion step 550. If scale 15 detects a logic "0", the tripping signal is initiated at step 570 from scale 15. If scale 15 detects a logic "1", then the trip signal is initiated at step 620 from the peripheral device through enabled switch 40. Finally the data transmission signal is printed by mailing machine 26 at steps 580 and 630.

Now turning to FIG. 4, the method begins at step 110 where the system is initiated. The method proceeds to step 120 where scale 15 is connected between postage scale 12 and one or more peripheral devices 31. The method proceeds to step 130 and determines if the scale received a Data Signal from Postage Scale 12. If the response to the query is "yes" then the method proceeds to step 140, if the response to the query is "no" the method ends at step 135. At step 140, the method queries whether a connection between one or more peripheral device 31, and SCALE 15 has been detected. If the answer to the query is "yes", the method proceeds to step 160. If the answer to the query is "no" the method ends at step 150. At step 160 the method queries if the IICA has received a signal from one or more peripheral devices 31. If the response to the query is "yes", the method continues at step 180. If the response to the query is "no" the method ends at step 170. At step 180 the method queries whether the signal received from step 160 is a logic "1".

If the response to the query at step 180 is "YES," then the method proceeds to step 190 and the analog switches are enabled. The method proceeds to step 200 where the IICA transmits the data signal to one or more peripheral devices 31. The method proceeds to step 210 where the peripheral device trips the mailing machine. The method continues at step 210 when the data is printed. Finally, at step 225 the method ends. If the response to the inquiry at step 180 is "NO," the method proceeds to 240 where data is transmitted to converter. The method proceeds to step 260 where the data signal is converted. The method continues to step 270 where the mail machine is tripped simultaneously while transmitting the data to the postage meter 32. The method proceeds to step 280 where the data is printed. Finally, at step 290 the method ends.

While certain embodiments have been described above in terms of the system within which the method may reside, the invention is not limited to such a context.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for interfacing a weighing scale and one or more peripheral devices, the method comprising the steps of:

(a) receiving at an interface device housed in said weighing scale a data transmission signal from said weighing scale;

(b) receiving at said interface device a signal from each of said one or more peripheral devices;

(c) determining at said interface device whether said signal from each of said one or more peripheral devices is a logic "1" signal or a logic "0" signal; and, if said determined signal is a logic "1", then (i) enabling a first switch and a second switch; and, (ii) transmitting said data signal through said first enabled switch to said peripheral device signal and maintaining said data transmission signal;

(d) determining at said interface device whether said peripheral device signal is a logic "1" signal or a logic "0" signal; and, if said determined signal is logic "0" then (i) transmitting said data transmission signal to a converter;

(ii) converting said data signal to correspond with said peripheral device; and (iii) transmitting said switched signal to said peripheral device to complete said interface.

2. The method of claim 1 further including the steps of:

(a) tripping a mailing machine simultaneously with said converting step;

(b) initiating said tripping from said converter device if said interface device detects a logic "0";

(c) initiating said trip signal from said peripheral device through said enabled second switch when said interface device detects a logic "1"; and, (d) printing said data transmission signal.

3. A method for interfacing between incompatible systems, the steps comprising:

(a) connecting an interface device between a first system having a first protocol and one or more peripheral devices having a second protocol;

(b) detecting a connection between said first system and said one or more peripheral devices at said interface device;

(c) receiving at said interface device a signal from each of said one or more peripheral device signal;

(d) determining at said interface whether the signal protocol of said peripheral device is a logic "1" or a logic "0";

(e) switching said first signal protocol to correspond to said determined second protocol by utilizing said interface device assembly if said peripheral device signal is a logic "0" or maintaining said first signal if said peripheral device signal is a logic "1";

(f) transmitting said switched signal or said maintained signal to said peripheral device; and (g) tripping a mailing machine simultaneously with said determining step; by initiating said tripping from said interface if said interface detects said logic "0"; or, initiating said tripping from said peripheral device when said interface detects said logic "1".

4. The method of claim 1 wherein said logic "1" is a predetermined range of voltage.

5. The method of claim 1 wherein said logic "1" is a 5 volt signal.

6. The method of claim 1 wherein said logic "0" is an open circuit.

7. The method of claim 1 wherein said peripheral device comprises an Echoplex meter.

8. The method of claim 1 wherein said peripheral device comprises a PB232 meter.

9. The method of claim 1 wherein said scale comprises a PB232 scale.

10. An apparatus for interfacing a weighing scale and one or more peripheral devices said apparatus comprising:

(a) a first end, said first end being connected to said weighing scale having a first port comprising one or more pins for receiving a data signal;

(b) a second end, said second end is connected to said peripheral having a second port comprising one or more pins for receiving at one of said one or more pins either a logic "1" signal or a logic "0" signal;

(c) a switching means, positioned between said first end and said second end, for activating one of a plurality of transmit lines when said switching means receives a logic "1" signal or activating another one of said transmit lines when said switching means receives a logic "0" signal; and, (d) wherein said activated transmit line transmits said data signal to a second of said one or more pins of said second port.

11. The apparatus of claim 10, wherein said apparatus further includes:

(a) a trip means for tripping a meter; and, (b) said trip means being activated when said switch means receives said logic "0" and said trip means remaining inactive if said switch means receives said logic "1".

12. The apparatus of claim 10 wherein said apparatus comprises a cable.

13. The apparatus of claim 10 wherein said scale and said apparatus are co-located.

14. The apparatus of claim 10 wherein said one or more peripheral devices and said apparatus are co-located.

15. The apparatus of claim 10 wherein said scale comprises a PB232 scale.

16. The apparatus of claim 10 wherein said one or more peripheral devices comprises an Echoplex meter.

17. The apparatus of claim 10 wherein said one or more peripheral devices comprises a PB 232 meter.

18. The apparatus of claim 11 wherein said one or more peripheral devices comprises an Echoplex optical device.

19. The apparatus of claim 11 wherein said switch means is analog.

20. A system for interfacing a weighing scale and a set of one or more peripheral devices said system comprising:

(a) said weighing scale having a first signal protocol;

(b) a set of one or more peripheral devices, each of said peripheral devices having a second signal protocol;

(c) an interface device operatively connected between said weighing scale and said set of one or more peripheral devices, said interface including:

(i) a first data transmission line;

(ii) one or more second data transmission lines; and, (iii) a switching means for connecting said first transmission line with one of said one or more second data transmission lines; and, (d) said switch means being activated when said first protocol does not correspond with said second protocol.

21. The system of claim 20 wherein said interface further includes a trip means for tripping a mailing machine; said trip means being activated when said switch means is activated.

* * * * *